No. 735,003. Patented July 28, 1903.

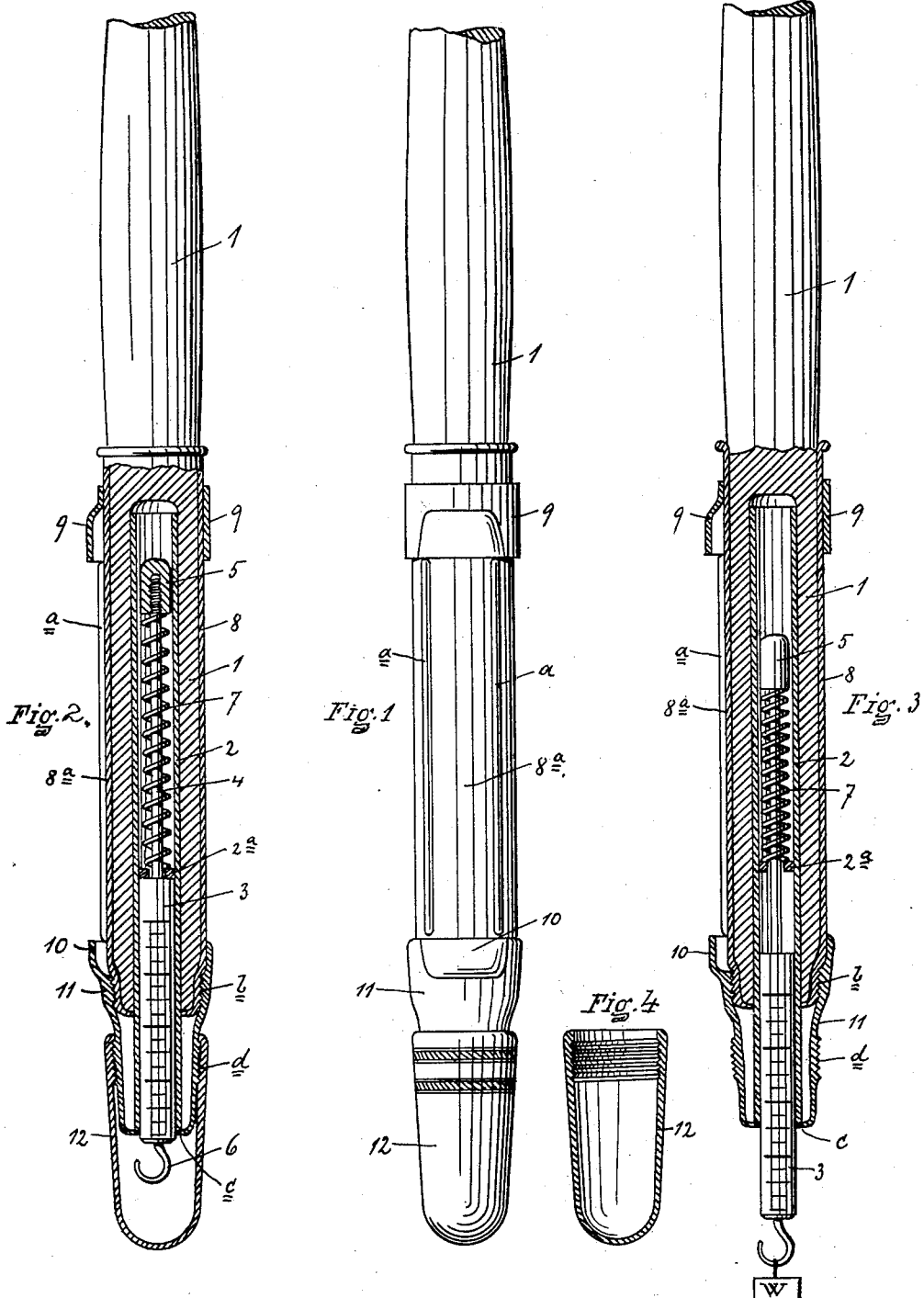

UNITED STATES PATENT OFFICE.

ROBERT H. WARD, OF MOHAWK, NEW YORK.

SCALE FOR FISHPOLES.

SPECIFICATION forming part of Letters Patent No. 735,003, dated July 28, 1903.

Application filed August 11, 1902. Serial No. 119,218. (No model.)

*To all whom it may concern:*

Be it known that I, ROBERT H. WARD, of Mohawk, in the county of Herkimer and State of New York, have invented certain new and useful Improvements in Scales for Fishpoles, &c.; and I do hereby declare that the following is a full, clear, and exact description of the invention, which will enable others skilled in the art to which it appertains to make and use the same, reference being had to the accompanying drawings, and to the letters and figures of reference marked thereon, which form part of this specification.

The object of my invention is to provide a spring-scale particularly adapted for use in fishpoles and handles of landing-nets, &c., having particular features of construction and means for retaining it in position.

In the drawings, Figure 1 shows a side elevation of the butt-end of a fishpole provided with my scale construction. Fig. 2 shows a longitudinal section of the same. Fig. 3 shows also a longitudinal section with the cap removed and the scale partially drawn out. Fig. 4 shows in section the cap which incloses the end of the scale.

Referring to the reference letters and figures in a more particular description, 1 indicates the pole or handle to which my scale is applied. In the end of the handle there is provided a socket which receives the tubular scale-casing 2. The scale consists of the casing 2, which protrudes somewhat below the end of the handle 1, and a movable draw or weight bar consisting of the graduated portion 3 and the stem portion 4, with an adjustable cap 5 on one end and a hook 6, by means of which a weight may be suspended at the other end. An internal shoulder $2^a$ is provided in the tubular body 2, and between the cap 5 and the shoulder $2^a$ is introduced a compression-spring 7. The cap 5 is screw-threaded onto the end of the spindle, whereby it may be adjusted. The lower end of the pole or handle is provided with an external casing 8, particularly in the manner of fishpoles, which casing provides a face or base $8^a$ between the ribs $a\ a$, on which the reel-plate is usually located.

9 indicates a slip-ring adapted to secure the upper end of the reel-plate, while the lower end of the reel-plate is introduced under the keeper 10, constituting a portion of the removable cap 11. The cap 11 is screw-threaded onto the reduced end of the casing 8 by screw-threads located at $b$. The lower end of the cap 11 is provided with a suitable opening through which the graduated draw-bar 3 can be passed and is also provided with a shoulder at $c$, which engages on the end of the scale-casing 2 and secures it in position within the socket. A further cap 12 is also provided, adapted to inclose the end of the scale and particularly protect the hook 6, and is removably secured, as shown in the drawings, by screw-threads at $d$. When the cap 12 is removed, the scale can be used by hanging the weight on the hook 6 and the graduations on the draw-bar 3 can be read at the lower end of the tubular body 2 and the cap 11. By removing the cap 11 the tubular body 2 of the scale can be withdrawn and the tension of the spring 7 can be adjusted by turning the screw-cap 5, which will protrude from the top of the body when in its upper position.

What I claim as new, and desire to secure by Letters Patent, is—

1. A scale for fishpoles, &c., a pole having a tubular scale-body inserted in a socket in the end thereof, a graduated draw or weight bar withdrawable from the end of the body, a scale-spring engaging the body and weight-bar, a cap removably secured on the end of the pole having a shoulder to engage and retain the tubular body in the socket, and an opening to allow the passage of the draw or weight bar and a removable cap for inclosing the end of the draw or weight bar, substantially as set forth.

2. The combination with a fishpole of a tubular body inserted in a socket in the end of the pole having an internal shoulder, a draw-bar having a graduated portion and a spindle spring-receiving portion and adjustable cap on the end of the spindle portion, a compressible spring introduced between the cap and the said shoulder, a removable cap on the end of the pole for retaining said tubular body and a removable cap for inclosing the end of the scale, substantially as set forth.

In witness whereof I have affixed my signature, in presence of two witnesses, this 1st day of August, 1902.

ROBERT H. WARD.

Witnesses:
W. H. H. STEELE,
WM. P. TAYLOR.